July 6, 1948. E. D. EATON 2,444,557
PROPELLER ANTI-ICER
Filed Feb. 4, 1943 2 Sheets-Sheet 1

INVENTOR
Edwin D. Eaton
BY Charles L. Shelton
Attorney

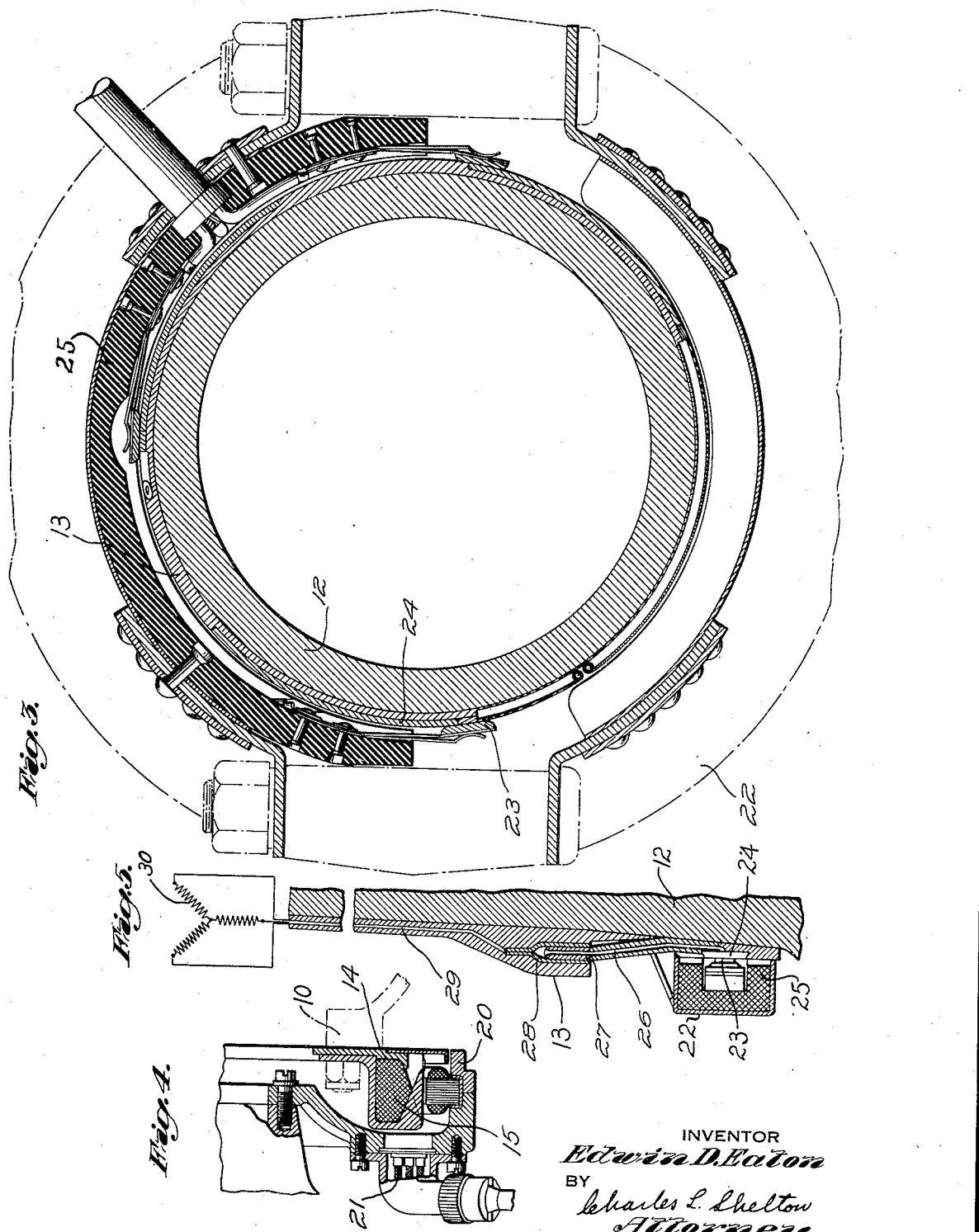

Patented July 6, 1948

2,444,557

UNITED STATES PATENT OFFICE 2,444,557

PROPELLER ANTI-ICER

Edwin D. Eaton, Manchester, Conn., assignor to United Aircraft Corporation, East Hartford, Conn., a corporation of Delaware Application February 4, 1943, Serial No. 474,684

6 Claims. (Cl. 244—134)

This invention relates to de-icers for aircraft propeller blades and particularly to an electric type de-icer having a generator to supply electric current to heater coils housed within the leading edges of the propeller blades.

An object of the present invention is to provide an electric generator having its stator on the engine nose, or other fixed part of the airplane adjacent the propeller, and its rotor on the propeller hub, both stator and rotor being concentric with the axis of rotation of the propeller.

A feature of importance of the invention is that the stator houses the field coils of an electric generator which preferably may include a number of poles, the field winding being excited preferably by voltage from any suitable source such as a small generator or battery mounted on the plane and rotation of the propeller creating a voltage in the armature winding in the rotor.

Another feature of importance is that the rotor closely surrounds the stator and is mounted on the propeller hub co-axially with the propeller from which leads extend to heating elements housed within the blades adjacent their leading edges, there being suitable slip ring and detachable connections provided in these leads between the propeller hub and the blades permitting angular adjustment of the blades about their longitudinal axes and removal of the blades from the spider.

Another object of the invention is to provide segmental slip rings within non-metallic cuff material at the shank end of the blades, these rings being connected to resistor heater windings within the blades adjacent their leading edges.

Other objects and advantages will be apparent from the specification and claims, and from the drawings which illustrate what is now considered to be a preferred embodiment of the invention.

In the drawings annexed hereto and forming a part of this specification:

Fig. 3 is a sectional view on an enlarged scale taken on the plane of line 3—3 in Fig. 1.

Fig. 4 is a fragmentary sectional view showing details of construction of the generator forming a part of the present invention.

Fig. 5 is a detail view of one of the leads from the collar surrounding the shank portion of a blade to heating elements (diagrammatically shown) mounted within the leading edge of the blade.

In modern airplanes it is desirable to provide some means to prevent formation of ice or to prevent its accumulation on the blades as it is being formed. For this purpose heaters in the form of resistor coils are inserted within the blades adjacent their leading edges where ice formation most frequently begins. These coils are connected, as will presently be described, to the armature winding of a generator, the connections or leads permitting pitch changing adjustment of the blades.

In its preferred form the invention may include the following principal parts: First, a generator field winding having any preferred number of poles and forming preferably the stator of a three phase generator mounted on the engine nose or other fixed part of a plane adjacent and concentric with the axis of rotation of the propeller; second, an armature having a winding preferably of three phase type mounted on the propeller hub for rotation therewith adjacent and closely surrounding the stator; third, leads extending from the rotor winding to contacts on the inner surfaces of collars fixed to the hub adjacent and surrounding the bases of the propeller blades; fourth, slip rings embedded within non-metallic blade cuffs and adapted to engage the contactors in the collars in any angular adjustment of the blade; and fifth, leads housed within the cuff material of the blades and extending to resistor heating coils within the blades and extending along the leading edges of the blades.

Figure 1:
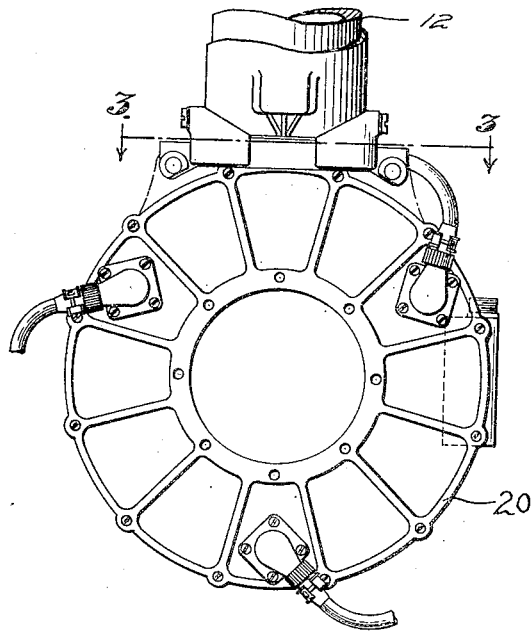
Fig. 1 is a front view in elevation of the de-icer, the propeller hub being omitted and a portion only of one of the blades being shown.
Figure 2:
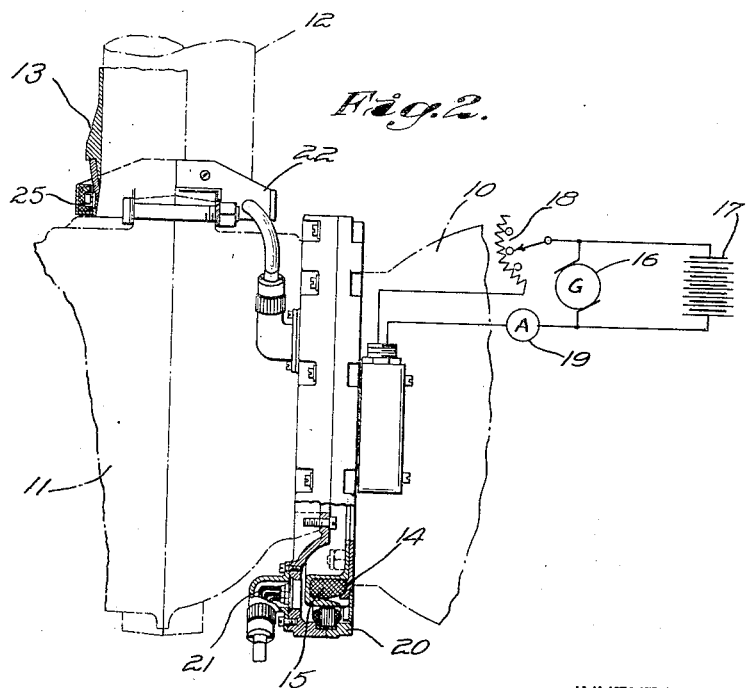
Fig. 2 is a side view in elevation and partly in section showing the principal parts forming the de-icing mechanism illustrated in Fig. 1.

Referring more in detail to the above figures of the drawing there has been shown a part of the forward end 10 of an aircraft engine or nose having a propeller hub 11 mounted for rotation adjacent thereto. Mounted within the hub 10 are propeller blades 12 those shown being of the pitch changing type. As the engine and propeller do not form any part of the present invention, further description of them will not be necessary. It will suffice to state that the propeller illustrated is of conventional three blade adjustable pitch construction and the blades 12 are of hollow metal construction to which are moulded non-metallic airfoil cuffs 13. On the forward end of the engine nose 10 is mounted in fixed position the stator 14 of an electric generator. This stator 14 is as shown of ring form and may be bolted directly to the end face of the engine nose or other fixed part of the plane on which the propeller is mounted. On this stator 14 are a plurality of poles suitably wound in a conventional and suitable manner connected to form the field circuit of an alternator. This field coil 15 may be excited from a small generator 16 or battery 17 shown diagrammatically in Fig. 2 and mounted at any convenient part of the plane. A rheostat 18 may be included in this circuit to vary the field excitation and an ammeter 19 to indicate the current supplied to the winding 15.

The rotor 20 of the generator, also of ring form, may be bolted directly to the rear face of the propeller hub 11 rotatable with the propeller so that it will closely surround and enclose the stator 14. This rotor 20 may be wound in any conventional manner preferably as a three phase armature winding and may be tapped at separated points with leads 21 extending to terminals for the individual blades 12 of the propeller.

The blade terminals of the leads 21 from the armature winding 20 may be housed within two part collars 22, one for each blade 12, clamped to the hub adjacent and surrounding the shanks of the blades. As indicated in Fig. 3 these blade terminals 23, of which there are three for each blade 12 are in the form of spring pressed heads on the inner surface of the collars 22 but insulated therefrom. Contacting with terminals 23 are segmental slip rings 24, one for each terminal and each ring housed within cuff material 13 at the shank end of the blades 12. The terminals 23 within the collar 22 may be spaced equidistantly about the inner periphery of the collar and may be supported for resilient swinging movement in suitable non-metallic and insulating material 25 within the collars 22. The segmental rings 24 within the blades 12 may extend about portions of the circumference of the cuff material 13 in positions to contact with the terminals 23 in all angular adjustments of the blades 12. By mounting the segmental rings 24 within the cuff material 13, which is non-metallic such as neoprene, the rings 24 are properly insulated one from the other and from the metal blades 12.

Extending from each slip ring 24 in each blade 12 are leads 26 each lead having a connection comprising a plug 27 and socket 28, the socket being moulded within the material 13 forming the blade cuff. From the sockets 28 at the base of the blades 12 extend leads 29 to resistance coils 30 forming heaters which may be housed within the cuff material adjacent the leading edge of each blade. The heater coils 30 shown diagrammatically only in Fig. 5 may be connected to the in leads 29 preferably in Y as shown.

It is to be understood that the invention is not limited to the specific embodiment herein illustrated and described, but may be used in other ways without departure from its spirit as defined by the following claims.

I claim:

1. An electrical de-icer for airplane propeller blades comprising in combination, a generator the stator of which is mounted adjacent the propeller, a rotor therefor mounted adjacent the propeller for rotation with the propeller and relative to said stator, means to supply a direct current voltage to said stator, leads from said rotor to the propeller blades, and heating elements housed within said blades and connected to said leads.

2. An electrical deicer for airplane propeller blades having heating coils within individual blades, comprising in combination, a multi-pole stator mounted on a fixed part of an airplane adjacent its propeller hub, a rotor mounted on the propeller hub adjacent said stator, means to excite said stator with direct current, terminals mounted on said rotor, an armature winding in said rotor having leads extending therefrom to said terminals, connections from said terminals to said heating coils including detachable connections, whereby removal of said blades from said hub may be effected.

3. An electrical de-icer for airplane propeller blades comprising in combination a generator having its field coils mounted on a fixed part of an airplane adjacent its propeller, means for supplying said field coils with direct current, a propeller hub for said propeller, an armature for said generator mounted for rotation with said hub and propeller, collars mounted on said hub surrounding said blades, terminals within said collars, leads from said armature to said terminals, and connections from said terminals to heater coils housed within the blades.

4. A generator for airplane propeller de-icers comprising in combination a multi-pole stator mounted adjacent the propeller to be deiced but restrained against rotation with said propeller, a rotor mounted on the propeller adjacent said stator, means to produce a substantially steady unidirectional magnetic field in said multi-pole stator, an armature winding in said rotor, and leads connecting said winding with resistor heating members within the propeller blades.

5. A generator for airplane propeller de-icers comprising in combination a multi-pole stator mounted adjacent the propeller to be deiced and held against rotation with said propeller, a rotor mounted for rotation with the propeller adjacent said stator, means to produce a substantially steady unidirectional magnetic field in said stator, a three phase armature winding in said rotor, and separate leads connecting said winding with resistor heating members within each of said propeller blades.

6. Current supply means for a propeller blade heater comprising, a propeller hub supporting said blade, a generator, comprising a rotor and an adjacent stator, said rotor being secured to said propeller hub and rotatable therewith, and said stator being held against rotation, means for rotating said propeller and rotor and means for energizing said stator with direct current whereby rotation of said propeller will generate current and provide current on said propeller hub without the use of movable joints.

EDWIN D. EATON.

REFERENCES CITED

The following references are of record in the file of this patent:

UNITED STATES PATENTS

| Number | Name | Date |
|---|---|---|
| 688,494 | Stern | Dec. 10, 1901 |
| 1,846,468 | Benson | Feb. 23, 1932 |
| 1,924,462 | Scofield | Aug. 29, 1933 |

FOREIGN PATENTS

| Number | Country | Date |
|---|---|---|
| 525,452 | Great Britain | Aug. 28, 1940 |
| 545,305 | Great Britain | May 19, 1942 |